A. W. FRANCE.
PISTON ROD PACKING.
APPLICATION FILED JUNE 11, 1909.
945,031. Patented Jan. 4, 1910.
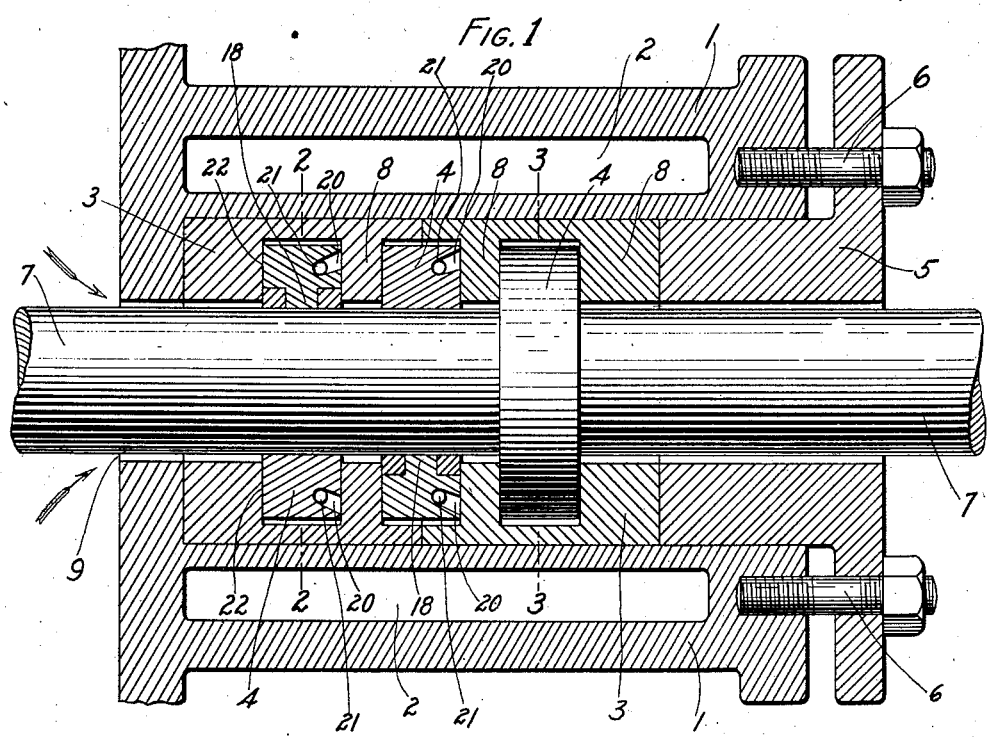
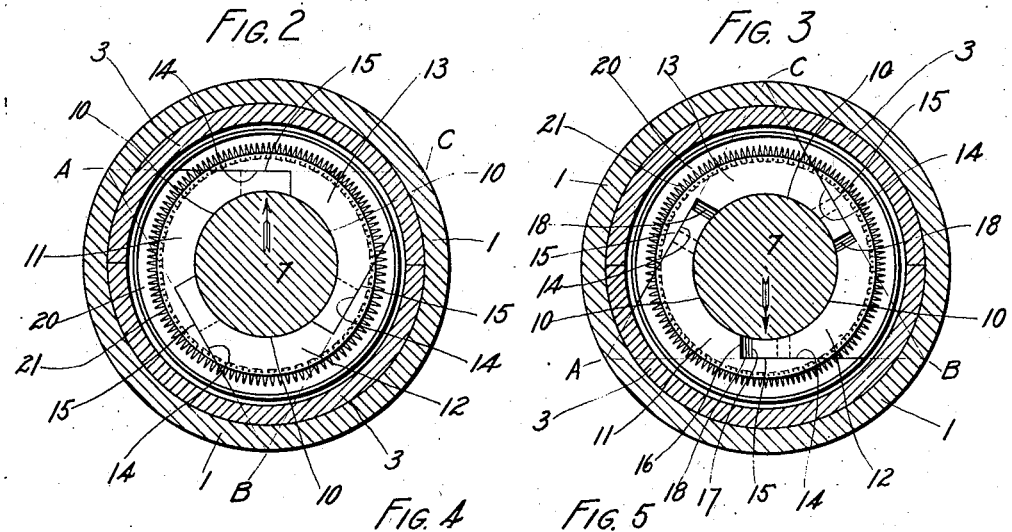
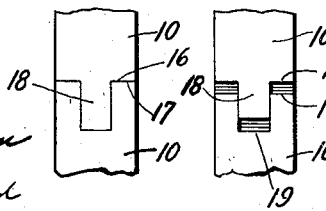
WITNESSES,
Howard Hancom
Nathan C. Lombard
INVENTOR,
ADAM W. FRANCE
BY Rob F. P. Hain
ATTY.

UNITED STATES PATENT OFFICE.

ADAM W. FRANCE, OF PHILADELPHIA, PENNSYLVANIA, ASSIGNOR TO THE FRANCE PACKING COMPANY, OF PHILADELPHIA, PENNSYLVANIA, A CORPORATION OF PENNSYLVANIA.

PISTON-ROD PACKING.

945,031.  Specification of Letters Patent.  Patented Jan. 4, 1910.

Application filed June 11, 1909. Serial No. 501,469.

*To all whom it may concern:*

Be it known that I, ADAM W. FRANCE, a citizen of the United States, residing at Philadelphia, in the county of Philadelphia and State of Pennsylvania, have invented an Improvement in Piston-Rod Packing, of which the following description, in connection with the accompanying drawings, is a specification, like characters on the drawings representing like parts.

The invention to be hereinafter described relates to piston rod packing of the general character set forth in my prior patent No. 636,512, dated November 7, 1899. In said prior patent there was shown, described, and claimed a rod packing comprising a packing ring formed of a plurality of relatively movable sections having inner and outer abutting faces extending at an angle to each other, so that as the piston or other rod varied in diameter these sections would move upon and relative to each other to maintain a steam or fluid tight joint under the action of an encircling spiral spring. In adapting this general character of rod packing to a gas engine, it is found that some gas will find its way into the ring retaining groove of the case above the ring, or, in other words, highly heated gas will get between the circumferential surface of the ring and the surrounding wall of the case, with the result that the temper of the spring which surrounds the ring is soon destroyed and, if the ring sections of the first ring are free to contract, the gas pressure on the circumferential surface of the ring will force the sections hard against the inclosed piston rod and cause scoring or injury thereto.

With these and other facts in view, the object of the present invention is to provide a piston rod packing which may be used either in gas or steam engines to form a gas or steam tight joint between the piston rod and the surrounding case, and which will be free from the objections at present encountered. These and other objects of the invention will best be made clear from the following description and accompanying drawings of one form of construction embodying the invention, it being understood that the true scope thereof is defined in the claims.

In the drawings: Figure 1 is a longitudinal sectional view of one simple form of stuffing box with the features of the present invention associated therewith; Fig. 2 is a transverse section on the line 2—2 of Fig. 1, showing the normal relation of the first packing ring and rod; Fig. 3 is a transverse section on the line 3—3, Fig. 1, showing the normal relation of the other packing rings of the set and the rod; Fig. 4 is a detached detail view looking in the direction of the arrow, Fig. 2, showing the shouldered portions of the first ring in normal condition bearing against each other so that the ring cannot contract any farther; and Fig. 5 is a detached detail view looking in the direction of the arrow, Fig. 3, showing the normal condition of separation between the shouldered portions of the sections of rings other than the first.

In the drawings, the stuffing box 1, water jacketed at 2 and having the interior chamber for the reception of one or more cases 3 for the packing rings 4, the gland 5 and screw bolts 6 for holding the gland and case or cases in place, and through which the piston rod 7 passes, may be of any usual or desired construction, the form of these parts shown being merely typical of a stuffing box and its usual associated parts.

As indicated in the drawings, the ring retaining element may be formed of one or more cases 3 preferably divided longitudinally, as usual, and held together by screw bolts or otherwise. Such case is also provided with division walls 8 forming grooves or recesses for the packing rings 4. The interior diameter of the division walls 8, the gland 5, and the cylinder opening at 9 for the passage of the piston rod 7 are preferably made somewhat greater than the diameter of the piston rod, so that the latter may have some play therein without danger of scoring, and for further reasons, as will presently appear.

Mounted in each of the recesses or seats of the retaining case 3, or, in other words, disposed between each two of the division walls or rings 8, which may be formed integral with the case or otherwise, is a packing ring 4, the structural characteristics of which are clearly illustrated in Figs. 1, 2 and 3.

Each of the packing rings 4 is formed of a plurality of sections 11, 12 and 13, as pointed out in my prior patent, the inner perimeters 10 of which are of the same radii, and these sections have angularly disposed abutting faces upon which opposed faces of the adjacent sections slide and form gas and steam tight joints. Each section has an outer abutting face 14 and an inner abutting face 15 both of which are disposed tangentially to the inner peripheries 10 of the sections, though not necessarily intersecting the same. These faces 14 and 15, when three are used, are formed and related as the sides of an equilateral triangle A, B, C, Figs. 2 and 3, though obviously the number of such sections and abutting faces may be increased, in which event the planes of the faces will be formed as the sides of a corresponding equilateral geometric figure, as will be readily understood.

At the inner end portion of the inner face 15 of each section is formed a shoulder 16, and at the inner end portion of the adjacent outer face 14 of the adjacent section is a shoulder 17, as best shown in Figs. 4 and 5. As pointed out in said prior patent, when the ring was expanded beyond its smallest dimensions, the shoulders 16 and 17 obviously separated somewhat and formed an opening between them through which gas or steam might pass, so that two rings were associated together between the division walls or rings of the case and arranged to break joints. In the present invention, however, the ring sections have transversely extending overlapping portions which continue to close the openings between the shoulders when the sections are separated, so that notwithstanding the expanded or contracted condition of a packing ring, a gas and steam tight joint is always presented between the ring sections, and, as a consequence, it is not necessary to use more than one packing ring between the division walls of the case, as will be apparent.

In the present form of the packing ring, the inner abutting face of each ring has projecting therefrom a tongue or overlapping portion 18, best shown in Figs. 4 and 5, which extends into a suitable recess or groove 19 formed in the adjacent portion of the next ring, so that when the sections of the ring are expanded and the shoulders 16 and 17 separated, as indicated in Fig. 5, the fingers or projecting portions 18 and the coöperating slots or recesses 19 continue to form a gas and steam tight joint closing the opening between the shoulders. If the projections 18 and coöperating slots 19 are omitted, evidently it will be desirable to use two packing rings, as in my prior patent, the openings between the shoulders breaking joints.

As well known by those skilled in the art, the temper of the surrounding spring for holding the ring sections together and in contracting position would be largely impaired, if not destroyed, if the heated gases from the explosion chamber of the gas engine came in contact with the spring, and with this fact in view, the present invention contemplates so housing and protecting the spring that the corrosive action of the gases thereon and the destruction of the spring temper are obviated. As one means of securing this result, the sections of the packing ring are provided with face recesses 20 the walls of which preferably converge from the face of the ring toward the seat for the spring 21, as indicated in Fig. 1, said spring 21 being preferably of a spiral character and extending circumferentially of the sections in the seating grooves 20 thereof, as indicated in Figs. 1, 2 and 3.

It will be understood that the groove 20 in the sections, when said sections are assembled, extends circularly and that the entrance to the groove 20 is of greater radius than said spring seating portion thereof, the effect being that by slightly expanding the spring 21 as it is placed in the groove 20, it will, by slightly contracting, force itself to its seat in the bottom of the groove and be retained therein, as will be readily understood by those skilled in the art.

Packing rings as thus constructed are placed in the retaining case, as indicated in Fig. 1, preferably one in each of the retaining recesses or grooves of said case, with the opening of the recess 20 of the ring facing outward or from the explosion cylinder. That is, the opening of the recess 20 when the ring is in place will face away from the explosion cylinder and toward the adjacent wall 8, the effect being that when the highly heated gas moves in the direction of the arrows of Fig. 1, between the piston rods 7 and the opening between the interior surfaces of the division walls of the case, it will act upon the plane face 22 of the packing ring and seat the opposite face of the ring containing the groove 20 firmly against the division wall or ring 8 of the case. It will be readily apparent from this that even should the heated gases get into the ring recess of the case, they cannot come in contact with or injure the spring 21 which is at such times sealed within the spring retaining groove 20.

As will be readily apparent to those skilled in the art, any gas that may get between the outer perimeter of the packing ring and the surrounding wall of the retaining recess, in other words, any gas which will get into the recess containing the packing ring will tend to cause a contraction of the ring, if the ring is free to contract, thereby forcing the sections thereof hard against the piston rod, with consequent injury and objection. In order to obviate this effect which is largely if not entirely confined to the ring next to the explosion cylinder and which, for identification, may hereinafter be termed the initial packing ring, the combined length of the inner perimeters of the initial ring when that ring is in its most contracted condition, as indicated in Fig. 2, is just equal to the circumference of the rod which it packs, so that any external pressure, as by gases, upon the outer perimeter of the ring will simply cause the shoulder portions 16 and 17 of the sections to be held more firmly in condition without at the same time contracting the ring so as to bind upon the rod. As the rod or interior perimeter of the initial ring wears, the shoulder portions and their tongues 18 may be trimmed off so as to preserve a proper fit between the ring and the rod.

The combined length of the inner perimeters of the other rings is less than the circumference of the rod which they pack, so that while the initial packing ring cannot contact and bind upon the rod in response to external gas pressure, the other rings may contract, in response to the surrounding spring 21, as the piston rod or inner perimeters of the rings wear, as will be readily understood.

From the described construction, it will be apparent that the spring 21 for holding the sections of the ring in position, as hereinbefore described, will at all times be sealed from the action of the highly heated gases or other fluids which may find their way between the ring and the surrounding walls of the case, and, as will be obvious to those skilled in the art, the packing rings may be arranged with one in each recess or between each of the division walls 8 of the retaining case, whether those walls be made integral or separate from such case, or, if desired, two or more of these rings may be thus placed, and, in any event, the spring retaining groove 20 of the rings will bear upon the face of the division wall of the case or upon the plane face of another ring, the ultimate effect being substantially the same.

It will be obvious to those skilled in the art that the retaining groove 20 for the spring may be variously formed, the characteristic essential thereof being that when the spring is seated therein it shall be sealed from the action of the gases or other fluids which tend to destroy its temper.

What is claimed is:

1. A packing ring comprising three or more relatively movable sections, each of which is provided with inner and outer abutting faces formed in planes corresponding to the sides of an equilateral geometric figure, said sections having a spring retaining groove in one of the side faces thereof, a spring for contracting said sections seated in said groove, a retaining case for said packing ring, and a wall against which the grooved face of the sections bear to close said groove to the entrance of expansive gases.

2. A packing ring comprising three or more relatively movable sections, each of which is provided with inner and outer abutting faces formed in planes corresponding to the sides of an equilateral geometric figure and having transversely disposed overlapping portions, said sections having a spring retaining groove in one of the side faces thereof, a spring for contracting said sections seated in said groove, a retaining case for said packing ring, and a wall against which the grooved face of the sections may be forced to close the groove to the entrance of the gases.

3. A packing ring comprising three or more relatively movable sections each of which is provided with inner and outer abutting faces formed in planes corresponding to the sides of an equilateral geometric figure, said sections having a spring retaining groove formed in one of the side faces thereof, a spring for contracting said sections seated in said groove, a retaining case and a division wall which closes the entrance to said spring retaining groove.

4. A packing ring comprising three or more relatively movable sections each of which is provided with inner and outer abutting faces formed in planes corresponding to the sides of an equilateral geometric figure and having transversely disposed overlapping portions, said sections having a spring retaining groove formed in one of the side faces thereof, the walls of said spring retaining groove converging toward the center of the ring, a spring for contracting said sections seated in said groove, a retaining case, and a wall against which the grooved face of the sections may bear to close said groove.

5. A packing ring comprising three or more relatively movable sections, each of which is provided with inner and outer abutting faces disposed at an angle to each other and formed in planes corresponding to the sides of an equilateral geometric figure, said sections being provided with a spring retaining groove in a side face thereof having a spring seat formed on a circle of less radius than the entrance to said groove, and a spring seated in said groove and tending to move the sections toward each other.

6. A packing ring comprising three or more relatively movable sections, each of which is provided with inner and outer abutting faces disposed at an angle to each other and formed in planes corresponding to the sides of an equilateral geometric figure, said sections being provided with a spring retaining groove in a side face thereof having a spring seat formed on a circle of less radius than the entrance to said groove, a spring seated in said groove and tending to move the sections toward each other, and a retaining case and a division wall against which the grooved face of the sections bear.

7. A packing ring comprising three or more relatively movable sections, each having an inner and an outer abutting face angularly disposed with relation to each other, the contacting inner and outer faces of adjoining sections forming steam joints, the abutting face of one section having a recess and the abutting face of the other section having a transversely extending portion to engage said recess, a spring retaining groove formed in the side face portions of said sections, and a retaining spring seated in said groove.

8. A packing for piston rods and the like, comprising a retaining case, division rings forming between them packing ring recesses, a packing ring contained in each of said recesses and formed of three or more sections having abutting faces disposed in planes corresponding to the sides of an equilateral geometric figure, a spring retaining groove formed in one side face of the ring sections, and bearing upon the face of a division ring, and a spring in said groove tending to draw the sections together.

9. A packing for piston rods and the like, comprising a retaining case, division rings forming between them packing ring recesses, a packing ring contained in each of said recesses and formed of three or more sections having abutting faces disposed in planes corresponding to the sides of an equilateral geometric figure, a spring retaining groove formed in one side face of the ring sections, and bearing upon the face of a division ring, and a spring in said groove tending to draw the sections together, the sections of the initial packing ring being non-contractible when on piston rod and the sections of the other rings being contractible when on said rod.

10. A packing for piston rods and the like, comprising a retaining case, division rings forming between them packing ring recesses, a packing ring contained in each of said recesses and formed of three or more sections having abutting faces disposed in planes corresponding to the sides of an equilateral geometric figure, said faces having interlocking transversely disposed projections and recess, a spring retaining groove formed in one side face of the ring sections, and bearing upon the face of a division ring, and a spring in said groove tending to draw the sections together.

11. A packing ring comprising three or more sections 11, 12 and 13 having abutting inner and outer faces formed in planes corresponding to the sides of an equilateral geometric figure, a spring retaining groove 20 formed in a side face of said sections and having a spring retaining seat, a spring 21 mounted in the seat of said spring retaining groove, and a retaining case for said packing ring having a division wall for closing the groove to the entrance of gases.

In testimony whereof, I have signed my name to this specification, in the presence of two subscribing witnesses.

ADAM W. FRANCE.

Witnesses:
W. C. BURKHOLDER,
F. H. COOPER.